UNITED STATES PATENT OFFICE.

ORAZIO LUGO, OF JERSEY CITY, NEW JERSEY.

IMPROVEMENT IN TREATING AND REVIVIFYING BONE-BLACK OR ANIMAL CHARCOAL.

Specification forming part of Letters Patent No. 179,579, dated July 4, 1876; application filed June 28, 1876.

*To all whom it may concern:*

Be it known that I, ORAZIO LUGO, of Jersey City, in the county of Hudson and State of New Jersey, have invented certain new and useful Improvements in Treating and Revivifying Bone-Black or Animal Charcoal; and I do hereby declare that the following is a full, clear, and exact description thereof, which will enable others skilled in the art to which it pertains to make and use the same, reference being had to the accompanying drawing, and to the letters of reference marked thereon, which form a part of this specification.

The first part of my invention consists of the introduction of the vapors of water or steam into a retort or retorts containing the bone-black or animal charcoal to be revivified, and to the exterior of which retort or retorts heat is applied.

The second part of my invention consists in the washing of the bone-black with water after being burned, in contact with steam or vapors of water at a high temperature; and The third part of my invention consists in drying the bone-black, after being burned and washed, in the manner and for the purpose hereinafter more fully specified.

Bone-black or animal charcoal is used in enormous quantities in the arts, and especially by the refiners of sugar, for the purpose of decolorizing solutions of raw sugar.

The commercial success of a sugar-refinery depends, to a very great extent, upon the condition of the bone-black, as regards the amount of sugar which it can decolorize. For instance, in filtering one hundred pounds of raw sugar (dissolved in water,) on one hundred pounds of bone-black, there is an inevitable loss of about two per cent. of sugar, which is absorbed by the bone-black, and cannot practically be removed. If, however, one hundred pounds of bone-black have the power of decolorizing four hundred pounds of the same quality of raw sugar of equal color, the loss of sugar will be reduced to one-half per cent. The saving of sugar, therefore, is very great in a sugar-refinery using or refining five hundred thousand pounds of sugar daily.

The manner in which bone-black is at present treated and used in sugar-refineries is substantially as follows: When the bone-black is fresh or new, or has been used before, it is first well washed with water, the water allowed to drain from it, and the bone-black is then placed or introduced into retorts or kilns, and returned or revivified simply by the application of heat to the exterior of the retorts. The bone-black is then drawn into pipes or coolers suspended directly under each retort, and when sufficiently cool, the bone-black is placed in vessels or filters to be used for the decolorization of solutions of raw sugar, &c.

The amount of sugar solution passed or filtered through the bone-black depends on the power of decolorization of the bone-black itself, or the quality of the raw sugar used. After a certain amount of colored sugar solution has been passed onto the bone-black, the latter ceases to decolorize it. At this point the bone-black is washed with water, in order to dissolve or extract as much of the sugar as possible, and is still further washed with water (which is allowed to run waste) for the purpose of dissolving the impurities which the bone-black may still retain.

When the bone-black is considered to be practically free from impurities that can be washed out, the water is allowed to drain off, and it (the bone-black) is revivified by heat, as before stated.

The apparatus in general use for the revivification of bone-black is a set of retorts or kilns of various forms, but having the same principle, viz: the washed bone-black is heated in retorts or kilns out of contact with free oxygen, at a high temperature, by means of free fire or heated gases applied to the exterior of the said retorts.

The operations above set forth are substantially carried on by every sugar-refinery using bone-black, and repeated as long or as many times as the bone-black is considered to be thereby rendered in a fit condition for decolorizing a reasonable amount of coloring-matter.

When the decolorizing power of the bone-black is reduced to a practical minimum, and cannot be restored by the ordinary process of revivification, it is rejected, as being exhausted, and replaced by new bone-black.

The process above described, and now in general use, is one of destructive distillation by dry heat. By this process of dry distillation the impurities which have been extracted from the solutions of sugar, &c., and which cannot be practically extracted by the previous washing with water, are carbonized upon the bone-black, and remain adhering to it in an insoluble condition, thus rendering the bone-black less effective as a decolorizer by each burning or revivification, until it becomes exhausted or useless for filtering purposes in a comparatively short time; but when the bone-black to be revivified is heated in a retort to a proper temperature, in the manner ordinarily practiced, as before described, with, however, the addition of a current of steam passing through the interior of the retort containing the bone-black, a process of destructive distillation takes place, differing from that above described.

It is a well-known fact that a large number of substances can only be carried over or distilled without total decomposition by means of a current of steam; and also, as in this instance, certain insoluble salts are rendered soluble when subjected to a current of steam while at a high temperature. These salts, which have been rendered soluble by the action of steam and heat combined, can be removed by washing the bone-black with water, thus keeping it in finer condition for a greater length of time than as if treated by any other known process.

The manner in which my process is carried out is as follows: The bone-black, whether it be new or has already been used is first well washed with water to remove any soluble salts, or other impurities, which water is afterward allowed to drain from it. The bone-black is then placed in retorts or kilns, similar in construction to those now in general use, and burned in the same manner, with, however, the addition of a steam pipe or pipes, for the purpose of introducing steam into the interior of the retort or retorts during the process of burning. The steam is to be introduced near the bottom of the retort.

The size of the steam-pipe may vary from three-eighths to five-eighths of an inch in diameter for a retort four inches broad, twelve inches wide, and seventy-two inches long, and the steam may vary in pressure from twenty to one hundred pounds to the square inch. The volume of steam introduced must not be excessive, as it will unnecessarily lower the temperature.

The volume of steam is to be regulated with valves, so that there may be a steady current passing through the retort. In this manner the revivification is also accelerated, as the current of steam, having become superheated, serves to distribute the heat evenly to every grain of bone-black in the retort, thus accomplishing the much-to-be-desired perfect revivification of the bone-black.

The time required for the revivifying or reburning of the bone-black is much shorter by my process than by the one now in general use, which can be ascertained by testing the bone-black with proper chemical reagents.

Well-washed bone-black can be revivified in about an hour, but the time mainly depends upon the condition of the bone-black acted upon. The revivified bone-black is then drawn from the retorts and placed in or let fall into tanks or vessels containing water, where it is well washed, for the purpose of dissolving and removing those salts and other impurities which have been rendered soluble by the action of the steam and heat combined.

The kilns for revivifying bone-black now in general use are provided with coolers, which consist of thin iron pipes, hung directly under the lower orifice of the retorts at the bottom of the kilns. The bone-black when sufficiently burnt is admitted into these coolers from the retorts by means of slide-valves, and there allowed to cool from four to six hours.

In adapting the kilns at present in use to my process, the coolers may be removed or not, as desired, as the hot bone-black can at once be let fall from the retorts into tanks containing water.

The revivified and washed bone-black is then drained of as much water as possible, and dried at a low temperature, or by exposure to dry air.

The most convenient and expeditious methods of drying the bone-black is to place it in retorts or kilns at a temperature of not more than from 220° to 300°, as I deem a higher temperature unnecessary. The bone-black when dry is ready for use.

The kilns now in general use for the revivification of bone-black can be adapted to work or be used in conjunction with my method of treating and reburning bone-black at a very small cost.

This is done by introducing steam-pipes into the retorts in any manner deemed most convenient and practicable.

A main steam-pipe can be laid on the top of kilns with branch steam-pipes running into each retort to within a few inches of the bottom. Each branch pipe may be provided with a cock or valve to regulate the supply of steam, as desired, in the manner and for the reason before described.

The advantages which my invention has over any other method of revivifying bone-black now in use, are, first, the increase of the decolorizing power of the bone-black from two (2) to four (4) fold; second, the keeping or preserving of the bone-black in a state similar to new; third, the bone-black when treated by my process will last for a much longer time than if revivified by any other, the only loss being first occasioned by actual wear and tear.

What I claim, and desire to secure by Letters Patent, is—

The process herein described for revivifying bone-black, consisting in subjecting it to the action of a current of steam in a heated retort or kiln, and then removing the soluble salts by washing, substantially as set forth.

In testimony that I claim the foregoing as my own invention I affix my signature in presence of two witnesses.

ORAZIO LUGO.

Witnesses:
JOHN R. McPHERSON,
THOMAS C. CONNOLLY.